Feb. 11, 1958  G. P. HARTER  2,822,941
LOAD CARRYING VEHICLE

Filed Feb. 7, 1955  3 Sheets-Sheet 1

INVENTOR.
GLENN P. HARTER
BY
*Paul, Moore&Lugger*
ATTORNEYS

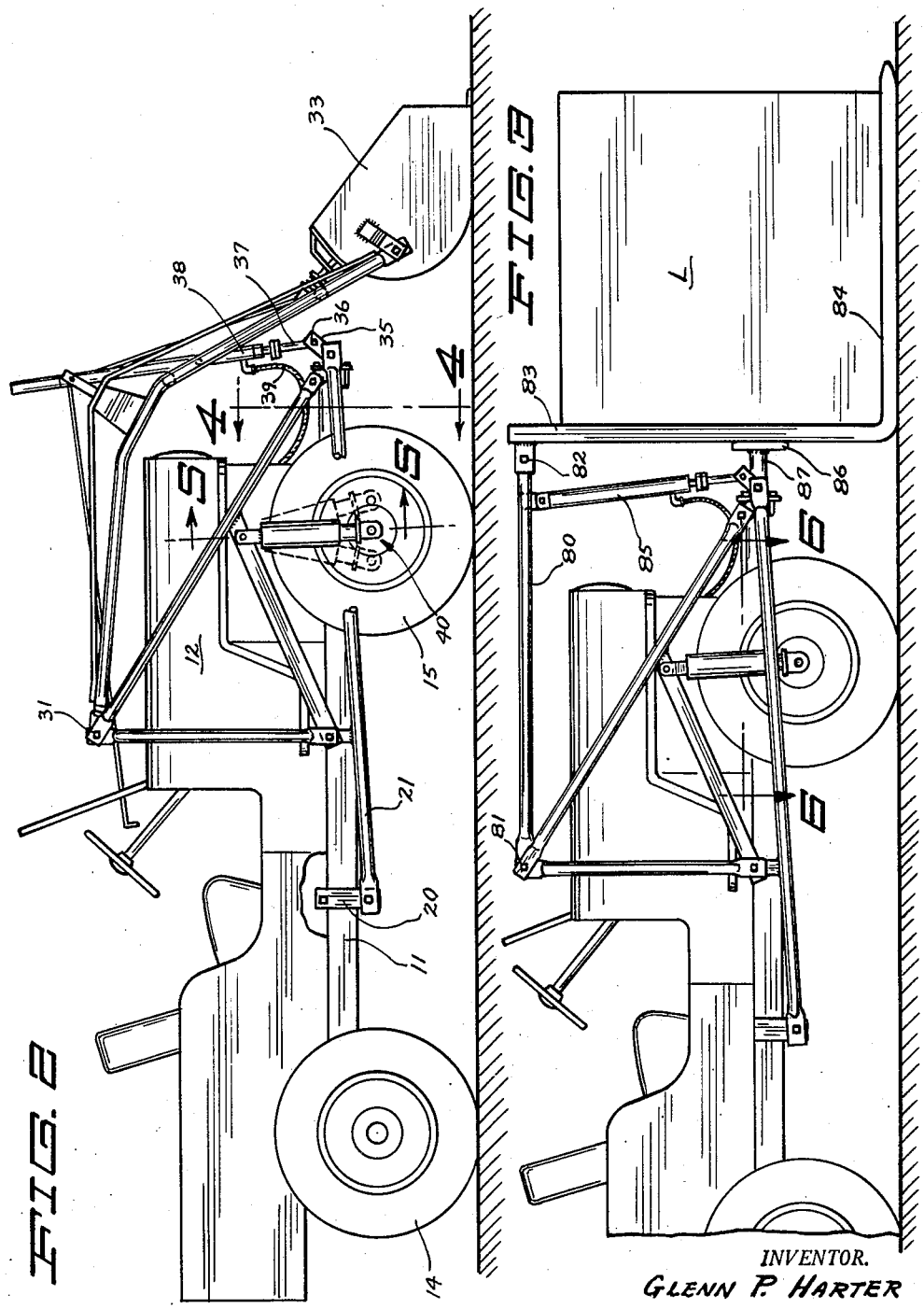

Feb. 11, 1958 G. P. HARTER 2,822,941
LOAD CARRYING VEHICLE
Filed Feb. 7, 1955 3 Sheets-Sheet 3
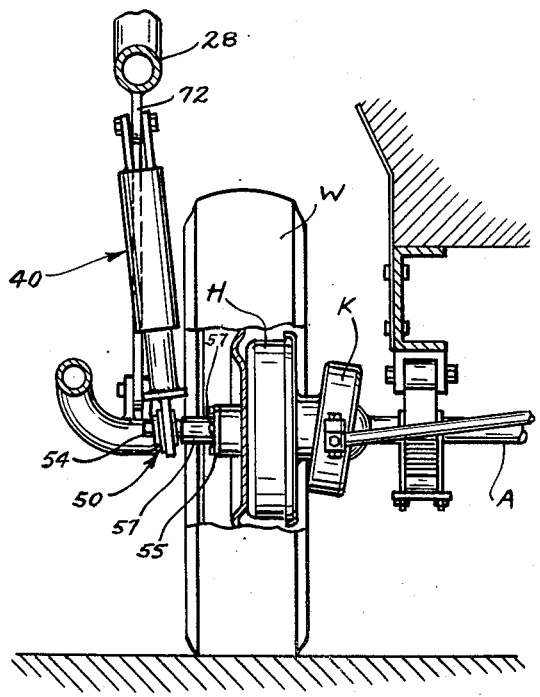
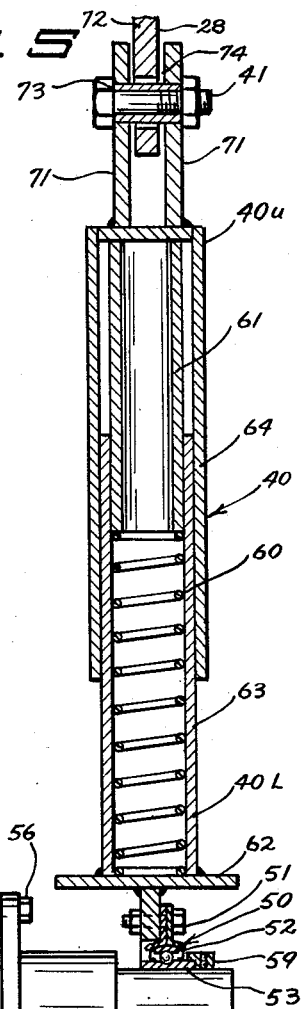
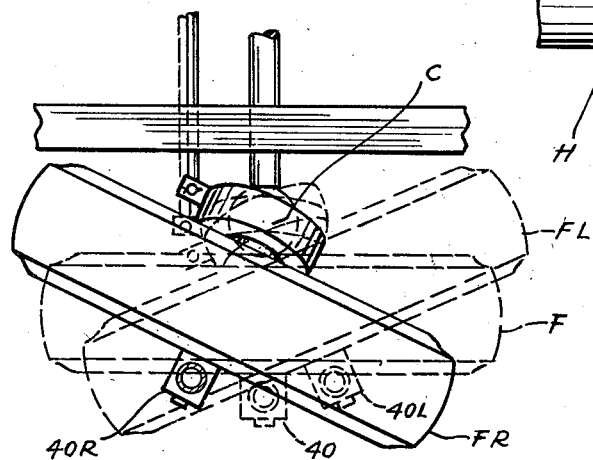
INVENTOR.
GLENN P. HARTER
BY
*Paul, Moore & Lugger*
ATTORNEYS

United States Patent Office 2,822,941
Patented Feb. 11, 1958

2,822,941

LOAD CARRYING VEHICLE

Glenn P. Harter, St. Louis Park, Minn., assignor to Minneapolis Freeman Mfg. Co., Minneapolis, Minn., a corporation of Minnesota Application February 7, 1955, Serial No. 486,479

9 Claims. (Cl. 214—131)

This invention relates to a load carrying vehicle and more particularly to a vehicle of the automotive type having a frame, a power source thereon which is adapted to be connected to wheels that are mounted on the frame for propulsion of the vehicle. Vehicles of this sort are usually supplied with one axle having steerable wheels thereon. A common vehicle of this type is a truck known in the trade generally as a "Jeep," which is adapted to sustain relatively heavy loads and to transport them at high speeds. The present invention is particularly adapted for attachment to vehicles of this type and more especially to the "Jeep" type automotive vehicle.

In vehicles of this type it is frequently desirable to provide an attachment by which a load may be sustained at the front or steering end of the vehicle. Frequently it is desirable to have the load carrying frame or attachment so constructed that the load may be carried out beyond the automotive frame. Examples of this type of attachment are the front end loaders, cargo handling equipment and the like, in all of which the load carrying frame extends to a considerable distance beyond the automative frame of the vehicle.

One disadvantage in respect to the use of such attachments on automotive vehicles of standard design is that the load imposed by the attachment may be more than as can properly be carried by the front axle construction of the vehicle. In the design of automotive vehicles, space, cost, normal usage, and other limitations imposed upon the designer certain limitations on the sizes of bearings that may be used within the wheels and elsewhere within the vehicle. As a consequence all automotive vehicles have a front end carrying weight of a certain load limit beyond which it is not expedient to load the vehicle. Usually the springs of a vehicle are sized so that when the front end is loaded to its maximum designed load carrying ability the springs will be completely compressed and the frame of the axle will rest, through rubber bumpers or the like, directly upon the vehicle, thereby indicating to the user that the front end is loaded to its maximum. However, this load carrying ability of the front end of an automotive vehicle is not usually sufficient to permit the designer of attachments to build them for adequate load carrying ability. Consequently it has not been feasible heretofore to provide, especially for small or medium size automotive vehicles, front end loaders of large load carrying and load lifting types, nor has it been feasible to provide front end cargo handling attachments, of the pallet or fork-lift type since the loads imposed by such materials moving or cargo handling operations are usually more than the designed maximum limit which may permissibly be imposed on the front end construction of the usual automotive vehicle.

It is an object of the present invention to provide an improvement for attachments for load carrying frames that are adapted to be mounted upon the front or steerable end of automotive vehicles. It is a further object of the invention to provide an improved attachment for the steerable end of automotive vehicles whereby loads greatly in excess of those heretofore capable of being imposed on the vehicle front end construction may now permissibly be carried. It is another object of the invention to provide an improved load carrying frame by which the load that is imposed by the frame on the vehicle is carried directly to the wheel rather than through the vehicle and thence through the vehicle axle structure and bearings to the wheel, as has heretofore been the case. It is another object of the invention to provide an improved load carrying frame so designed that it will support the weight of the vehicle directly to the wheels in a manner additional to and as a supplement to the load carrying structure ordinarily provided in said vehicle.

Other and further objects of the invention are those inherent and apparent in the apparatus as described, illustrated and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings in which Figure 1 is a perspective view from the front, of a small automotive vehicle of the "Jeep" type, having one illustrative form of improved load carrying frame of the present invention shown attached thereto.

Figure 2 is a side elevational view of another automotive vehicle showing the load carrying attachment in a side elevation, the attachment being the same as that shown in Figure 1.

Figure 3 is a side elevational view of a small automotive vehicle showing another form of load carrying attachment connected to the vehicle as in accordance with the present invention.

Figure 4 is an enlarged fragmentary vertical view, partly in section and taken along the line and in the direction of arrows 4—4 of Figure 2.

Figure 5 is a fragmentary enlarged vertical sectional view of the load carrying strut portion of the load carrying frame of the present invention, taken along the line and in the direction of arrows 5—5 of Figure 2.

Figure 6 is a fragmentary plane view of one of the front wheels of the load carrying automotive vehicle in which the present invention is incorporated, Figure 6 being taken along the line and in the direction of arrows 6—6 of Figure 3.

Throughout the drawings corresponding numerals refer to the same parts.

Figure 1:
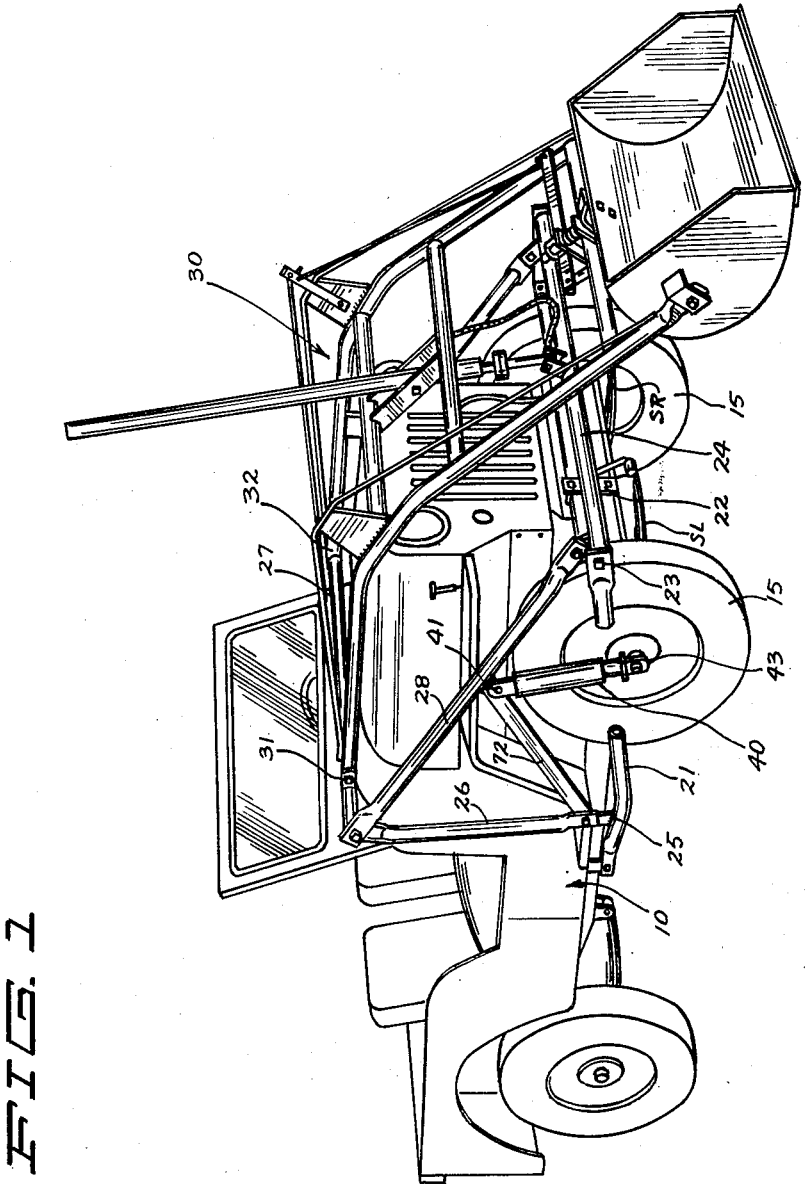

Referring to the drawings the automotive vehicle may be considered as a small truck. It has a vehicle frame 11 upon which there is mounted an automobile engine in a compartment 12, the engine being connected through a suitable transmission and clutch mechanism, not illustrated, so as to be in driving relation with respect to the rear wheels 14, and may optionally be connected in many of the vehicles so as to also drive the front wheels 15—15. While the vehicle specifically illustrated is what is commonly called the "Jeep," it must be understood that the present invention is by no means limited in its application to vehicles of this specific make or type. Generally speaking, the attachment of the present invention is applicable to those vehicles which have the following characteristics:

(1) The vehicle has a frame on which is a cross axle at one end, having king pins at the opposite ends of the axle so as pivotally to support stub axles in steering relation in respect to the vehicle, the stub axles being provided with bearings upon which the wheel hubs are rotatably mounted, wheels being mounted upon the hubs, and steering mechanism provided.

(2) An engine on the frame connected through a suitable power transmission so as to be in driving relation to the rear wheels of the vehicle and optionally in driving relation to the front steerable wheels of the vehicle.

(3) Some sort of body in which the operator may sit and a steering wheel at the operator position adjacent to the engine and transmission controls by which the vehicle may be manipulated, steered and controlled.

(4) Usually the vehicle is provided with springs by which the front steerable axle and the rear axle are spring-mounted in respect to the vehicle, although this is not considered as an essential characteristic of the vehicle to which the invention hereof is applicable.

To such a vehicle the load carrying frame of the present invention is attached. One form of frame is illustrated in Figures 1 and 2 and consists of an attachment plate at 20 at about the middle of the automotive frame. One such plate is attached to each side frame member of the automotive vehicle and serves as a mounting by which a forwardly extending strut 21 at each side of the vehicle is adapted to be attached. Across the front of the vehicle there is a front frame 24, which in the particular vehicle shown, is attached by the plates 22 to the front bumper of the vehicle, although this specific form of attachment must be considered as merely illustrative and as an adaptation for the specific vehicle shown. The front cross frame member 24 is provided with bolts 23 by which it is connected to the side frame members 21 at opposite sides of the automotive vehicle. Extending upwardly from the side frame members at the junction 25 there is provided an upwardly extending strut 26 which reaches across the vehicle by means of the cross frame 27. Downwardly extending diagonal braces are provided at 28 at each side of the vehicle and knee braces at 72.

This basic frame unit is thus firmly attached to the automotive frame and moves with it both up and down, forwardly and rearwardly, as the automotive frame is propelled and moved. Upon this basic frame, which may be varied in specific detail so as to suit the particular vehicle to which the construction is adapted, there may be attached a load carrying frame, which in the illustration of Figures 1 and 2, is a loader frame generally designated 30. The specific details of the loader frame form no part of this invention, being illustrative merely of a representative overhanging front end load. This loader is illustrated and claimed in my co-pending application Serial Number 451,112, filed August 20, 1954, and now abandoned. The loader frame 30 is pivoted to the basic frame at 31 and 32 and has a load-accepting bucket 33 at the forward end. To the cross frame member 24 there are attached outwardly extending lugs 35, to which there is pivotally attached at 36 the lower end of the piston rod 37, which works in the hydraulic cylinder 38, connected by the hose 39 to a suitable source of hydraulic pressure mounted in the automotive vehicle. As a consequence, when pressure is introduced in the hydraulic cylinder 38 the frame 30 is caused to lift and with it the bucket 33 and any load in it is likewise lifted. This imposes a strong downward thrust upon the cross frame member 24 which would normally be carried through the front bumper of the main vehicle, thence through the springs SL and SR at the front of the vehicle, thence to the vehicle front axle A and through the king pin at K, and through the stub axle mounted upon the king pin, and thence to the wheel hub at H and to the wheel and tire. The load would thus ordinarily be transferred through the automotive vehicle springs, frame, axle, king pin, stub axle, hub and wheel and tire to the earth surface. The load which can therefore permissibly be carried by this route through the mechanism is only that which is capable of being sustained by the particular sizes of automotive elements used by the automotive designer in the construction of his vehicle.

According to the present invention there is provided at each side of the vehicle a downwardly extending strut 40 which has its upper end loosely pivotally connected at 41 to the basic load carrying frame which is attached to the automotive vehicle. The lower end of the strut 40 is provided with a flat mounting plate 43 having a large aperture through it at 44, see Figure 5. Concentrically with the aperture there is mounted a self-aligning bearing unit generally designated 50, having a spherical portion 51 which forms a seat for the outer race 52 of the bearing. The inner race 53 of the bearing is mounted upon an extension 54 which is a shaft mounted concentrically with the hub H of the automotive vehicle. It will be recalled that within the hub of the usual automotive vehicle are provided bearings, not illustrated in the drawings herein. However, the hub is usually mounted on ball or tapered roller bearings and rotates on the stub axle which is steerable in respect to the main axle structure at the front end of the automotive vehicle. The outer end of the hub is generally covered with a hub cap. In this instance the hub cap is removed and a separate unit is bolted in place, this separate unit being composed of a plate 55 that is held onto the hub by means of the cap screws 56—56. Extending outwardly from the plate 55 is a central tube 57 having the concentric outwardly extending axle extension 54 thereon, on which the inner race 53 of the self-aligning bearing structure 50 is attached. The race 53 is held in place by a locking ring 58 which is of the eccentric variety, being turned so as to form a lock between the member 53 and the extending shaft 54. The eccentric member 58 is then held in place by set screws at 59, against subsequent displacement. The strut 40 is preferably composed of endwise compressible members 40L and 40U, between which there may be compressed a spring 60.

As a consequence, when a load is imposed by the main frame member 28 through the pivot at 41 upon the member 40U, this load is transferred thence to the inner cylinder 61 to the upper end of the spring 60 and thence through the spring to the plate 62, which form the bottom of another cylinder 63 which nests between the cylinder 61 and the outer cylinder 64. Accordingly, a compressive load is carried in spring supported relationship from the pivot 41 down through the strut 41 to the bearing 50, and thence directly to the hub H of the wheel of the vehicle.

It is obvious that other forms of construction of this strut could be provided, the desideratum being that the strut should carry a compressive load in spring supported relationship.

The size of spring 60 is so selected that when a load is imposed upon the bucket or other load carrying portion 33 of the load carrying frame, such load will be transferred preferentially through the two struts 40 at opposite sides of the vehicle and thence directly to the two hubs H—H at opposite ends of the steerable axle. In this way the load of the attachment is not imposed through the normal carrying paths which include the frame, springs, axle and bearings of the automotive vehicle. Indeed, it is possible by selecting stiff springs, as spring 60 of the struts 40, to actually carry some of the load of the entire automotive vehicle through the attachment frame, when the vehicle is in its unloaded condition and, in this way, the springs SL and SR at the front end of the automotive vehicle will become somewhat unloaded and may even be negatively loaded. In such condition the normal bearings within the hubs H at the end of the steerable stub axles on the main axle A will serve only to steady the axle against displacement, the load being then carried through the self-aligning bearings 50 which are attached directly to the hubs.

As shown in Figures 2 and 6, the lower end of the strut 40 will follow a path which is arcuate when viewed in the horizontal plan, as shown in Figure 6. I prefer that the strut 40 should be positioned so as to be generally upright when the front steerable wheels of the vehicle are in the forward steering direction, as shown at position F in Figure 6. In this position the strut 40 is practically straight up and down being slanted in a little toward the wheel at the lower end, see Figure 4. When the wheel is moved to the left steering position FL, the strut 40 will move to the position 40L, as shown, about the arcuate path of travel determined by the position of the self-aligning bearing 50 in respect to the king pin center C about which the stub axle pivots. Likewise, when the wheel F is turned to the right steering position FR, which is shown in full lines, the strut will then be moved to the position 40R, which is also on the arcuate path of travel. Of course, it will be understood that in Figure 6 only the lower part of the strut is shown.

The upper end of each of the struts 40 is connected by means of the bifurcated ends 71—71, composed of two space plates which are spaced apart so as to provide considerable looseness at each side of the bar 72 which forms a part of the main load carrying frame. The pivot bolt 41 extends through an aperture in the bar 72 and may be provided, if desired, with a sleeve bearing as at 73. The aperture at 74 in the bar 72 is sufficiently large so as to provide considerable looseness of fit, thereby permitting the unrestricted movement of the strut 40 when its lower end is moved about the arcuate path of travel illustrated in Figure 6, and also permitting those movements which are imposed by the springing movement of the automotive vehicle frame with respect to the front axle A.

As shown in Figure 4, the main load carrying frame members 28 and 72 are positioned in a somewhat upward position relation in respect to the wheel W and, as a consequence, the strut 40 has normally a downwardly and inwardly slanted position. This is no impediment to the operation but adds to the steadying effect of the entire device. Thus loads imposed by the frame on the wheels are carried downwardly and inwardly to the hubs and hence to the wheels. The looseness of fit at the bolt 40 easily permits any rocking, tipping or arcuate movement required by the travel of the stub shaft 54 extending outwardly from the hub H. A ball joint may be substituted at pin 41, but adds to the cost.

Referring to Figure 3, there is illustrated another form of load carrying frame. Thus, while in Figures 1 and 2 the load carrying device was a bucket loader or so called hydraulic loader, in Figure 3 the basic load carrying frame has outwardly extending reach arms at 80, which are pivoted to the frame at 81. The reach arms extend forwardly and are pivotally connected at 82 to a bracket of an upstanding frame 83 which has vertical members reaching normally to the ground level and thence extending forwardly at 84, forming a fork or platform upon which the load L, such as a pallet load, may be placed. A hydraulic lift arrangement at 85 is provided so as to move the reach arms 80 up and down arcuately and, hence, lift and raise the frame 83–84. Tendency toward rearward movement of the frame 83–84 is taken by a flat plate at 86 which is attached by the frame supports 87 to the main load carrying attachment frame. The device shown in Figure 3 is very convenient for shifting loads that are carried on load carrying pallets, the type of loads which are normally carried by fork trucks.

It is apparent that many modifications and variations of this invention as hereinbefore set forth may be made without departing from the spirit and scope thereof. The specific embodiments described are given by way of example only and the invention is limited only by the terms of the appended claims.

What I claim is:

1. In a steerable automotive vehicle adapted to carry a load on the steered end, said vehicle having a longitudinally extended automotive frame, wheels on the frame supporting it for movement, at least some of said wheels being connected to a source of power on the frame for moving said frame, and having at least two transversely opposite wheels mounted on a cross axle at the steerable end of the frame, said cross axle having upright king pins at opposite ends thereof, having stub axles pivotally mounted thereon for steering movement and bearings on said stub axles and wheel hubs and wheels rotatably carried by said bearings, all for steering the frame as it is moved automotively, the improvement comprising a load frame connected to the automotive frame so as to be carried thereby in an overhanging position beyond said cross axle, additional connections between said load frame and each steerable wheel, each said additional connection including a bearing mounted concentrically with one of the steerable wheel hubs for independently transferring some of the load frame load directly to the hub, and a self-aligning mounting for each said bearing, said mounting being attached to the lower end of a strut extending upwardly from said self-aligning mounting for each said bearing, said mounting being attached to the lower end of a strut extending upwardly from said self-aligning bearing, said strut being pivotally attached at its upper end to said load carrying frame.

2. The improvement specified in claim 1 further characterized in that each strut has spring means thereon for transferring in spring supported relation a compressive load imposed on said strut.

3. The improvement in claim 2 further characterized in that said cross axle is spring-mounted on the longitudinally extending frame and the spring means of the struts is sized so as to transfer a major portion of the load of the load frame directly through said spring means to the steerable wheels.

4. The improvement of claim 1 further characterized in that said struts are pivoted to the lift frame so as to be in a substantially upright position when the stub axles are positioned to steer the vehicle in a substantially straightforward direction.

5. In a vehicle of the automotive load carrying type having an automotive frame having at one end a first cross axle at one end of the frame, which axle is equipped at each end with king pins with steerable wheel supporting stub axles projecting outwardly thereon beyond the frame, each such stub axle having a bearing thereon and a wheel hub rotatably mounted on the bearing and a wheel carried by the hub, and having a second cross axle at the opposite end of the automotive vehicle having wheels thereon connected to a power source on the vehicle, the improvement comprising a load carrying frame connected to the automotive frame and oriented thereon so as to be above and to extend outwardly at one end beyond said first cross axle, said load frame including one portion at each side of the vehicle above and generally over the pivotal path of the movement of the end of the steerable stub axle at that side of the automotive frame, a strut at each side of the automotive frame positioned in a generally upright position extending downwardly to adjacent the end of the steerable stub axle, each said strut being loosely pivotally connected to said load carrying frame so that a load on the latter will be transferred downwardly through the strut, and a self-aligning bearing having inner and outer races and a self-aligning mounting, attached to the lower end of each strut and having one race concentrically attached to the wheel hub, for transferring directly to the hub, and through it to the wheel a downward load imposed by the load frame onto the strut.

6. The improvement of claim 5 further characterized in that said strut is composed of two endwise movable members having spring means therein for resiliently transferring a compressive load through said strut.

7. The improvement of claim 6 further characterized in that said first and second cross axles are spring-mounted on the automotive frame.

8. The improvement of claim 7 further characterized in that said spring means of said struts is sized so as resiliently to support a major part of the vehicle weight when the load frame and vehicle are unloaded, and has a load-deflection ratio such that a load placed on the load frame is carried for the most part through said struts.

9. The improvement of claim 6 further characterized in that said struts are composed of nested, endwise slidable cylinders having a coiled compression spring therein for compressively carrying in spring supported relation a compressive load on the strut.

References Cited in the file of this patent

UNITED STATES PATENTS

| 2,347,882 | Choate et al. | May 2, 1944 |
| 2,538,102 | Keeler | Jan. 16, 1951 |
| 2,627,405 | Hlatho et al. | Feb. 3, 1953 |

FOREIGN PATENTS

| 1,012,586 | France | July 15, 1952 |